US010686752B2

(12) United States Patent
Boucadair

(10) Patent No.: US 10,686,752 B2
(45) Date of Patent: Jun. 16, 2020

(54) METHODS FOR CONFIGURING AND MANAGING AN IP NETWORK, CORRESPONDING DEVICES AND COMPUTER PROGRAMS

(71) Applicant: Orange, Paris (FR)

(72) Inventor: Mohamed Boucadair, Betton (FR)

(73) Assignee: ORANGE, Paris (FR)

(*) Notice: Subject to any disclaimer, the term of this patent is extended or adjusted under 35 U.S.C. 154(b) by 279 days.

(21) Appl. No.: 15/025,724

(22) PCT Filed: Sep. 19, 2014

(86) PCT No.: PCT/FR2014/052329
§ 371 (c)(1),
(2) Date: Mar. 29, 2016

(87) PCT Pub. No.: WO2015/044565
PCT Pub. Date: Apr. 2, 2015

(65) Prior Publication Data
US 2016/0219016 A1 Jul. 28, 2016

(30) Foreign Application Priority Data
Sep. 30, 2013 (FR) .................................. 13 59434

(51) Int. Cl.
H04L 29/12 (2006.01)
H04L 12/64 (2006.01)

(52) U.S. Cl.
CPC ...... H04L 61/2007 (2013.01); H04L 12/6418 (2013.01); H04L 61/2061 (2013.01)

(58) Field of Classification Search
CPC .................................................. H04L 61/2007
(Continued)

(56) References Cited

U.S. PATENT DOCUMENTS

2002/0194369 A1* 12/2002 Rawlins .................. H04L 41/08
709/238
2004/0233907 A1* 11/2004 Hundscheidt ......... H04L 12/185
370/390
(Continued)

FOREIGN PATENT DOCUMENTS

FR 2843266 A1 2/2004
WO 01019025 A2 3/2001
WO 01086908 A1 11/2001

OTHER PUBLICATIONS

International Search Report and Written Opinion dated Dec. 3, 2014 for International Application No. PCT/FR2014/052329, filed Sep. 19, 2014.
(Continued)

Primary Examiner — Umar Cheema
Assistant Examiner — Tony Williams
(74) Attorney, Agent, or Firm — David D. Brush; Westman, Champlin & Koehler, P.A.

(57) ABSTRACT

A method of configuring a network including a node incorporating decision-making functions, referred to as a PDP node, and at least two nodes incorporating decision-executing functions, referred to as PEP nodes, including at least one PEP node that is directly connected to the PDP node and at least one PEP node that is not directly connected to the PDP node. The method includes the following acts: identifying the PDP node from a message received by the PEP node; allocating to the PEP node at least one IP address that is distinct from a link-local address, the at least one IP address being obtained from a set of addresses known to the PDP node; and obtaining a list of at least one available IP address for allocation to at least one other node directly connected to the PEP node in the network and not possessing an IP address, referred to as a "undiscovered" node, which
(Continued)

list, referred to as a list of delegated addresses, is transmitted by the PDP node and is obtained from the set of addresses.

14 Claims, 2 Drawing Sheets

(58) Field of Classification Search
 USPC .......................................................... 709/245
 See application file for complete search history.

(56) References Cited

U.S. PATENT DOCUMENTS

| | | | |
|---|---|---|---|
| 2005/0091409 A1* | 4/2005 | Williams ............ | H04L 41/0893 709/247 |
| 2005/0267983 A1 | 12/2005 | Ksinant et al. | |
| 2006/0039364 A1* | 2/2006 | Wright ................ | H04L 41/0893 370/352 |
| 2006/0182034 A1* | 8/2006 | Klinker ................... | H04L 43/00 370/238 |
| 2008/0225712 A1* | 9/2008 | Lange ................... | H04L 47/722 370/230.1 |
| 2009/0119770 A1* | 5/2009 | Soliman .................. | H04L 63/20 726/14 |
| 2010/0050040 A1* | 2/2010 | Samuels .................. | H04L 69/16 714/749 |
| 2011/0055900 A1* | 3/2011 | Chua ....................... | H04L 63/08 726/4 |
| 2013/0103836 A1* | 4/2013 | Baniqued ............ | H04L 41/0803 709/226 |

OTHER PUBLICATIONS

English translation of the International Search Report and Written Opinion dated Dec. 3, 2014 for International Application No. PCT/FR2014/052329, filed Sep. 19, 2014.

French Search Report and Written Opinion dated Jun. 27, 2014 for French Application No. 1359434, filed Sep. 30, 2013.

Mcauley et al., "Self-Configuring Networks", MILCOM 2000. 21st Century Military Communications Proceedings Oct. 22-25, 2000, Piscataway NJ, USA, IEE, vol. 1, Oct. 22, 2000 (Oct. 22, 2000), pp. 315-319, XP010532606.

Yavatkar et al., "A Framework for Policy-based Admission Control", Network Working Group, RFC 2753, The Internet Society (2000), Jan. 2000.

Durham et al., "The COPS (Common Open Policy Service) Protocol", Network Working Group, RFC 2748, The Internet Society (2000), Jan. 2000.

Chan et al., "COPS Usage for Policy Provisioning (COPS-PR)", Network Working Group, RFC 3084, The Internet Society (2001), Mar. 2001.

Cheshire et al., "Dynamic Configuration of IPv4 Link-Local Addresses", Network Working Group, RFC 3927, The Internet Society (2005), May 2005.

Hinden et al., "IP Version 6 Addressing Architecture", Network Working Group, RFC 4291, The Internet Society (2006), Feb. 2006.

Ho-In Jeon "Efficient Address Assignment for Mesh Nodes in Real-Time", IEEE, (2005), Kyung-Won University, HNRC of IITA Republic of Korea.

Lee et al., "Management of PDP/PEP for PBNM in MANETs" IEEE, (2006); 4 pages.

\* cited by examiner

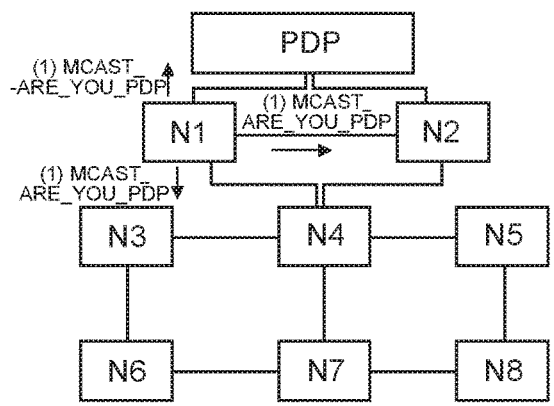
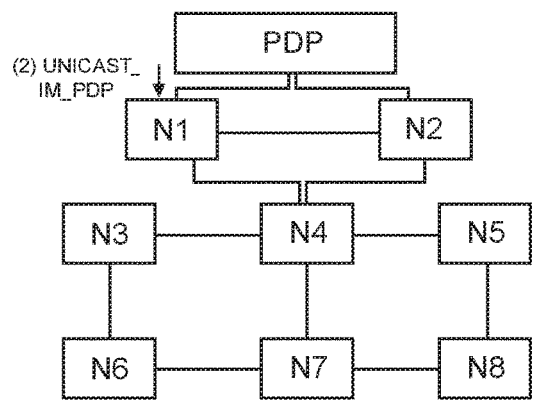
Fig. 4A
Fig. 4B
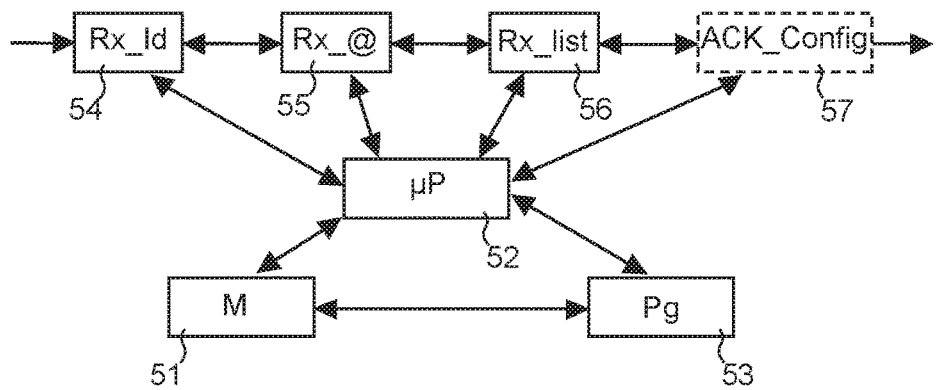
Fig. 5
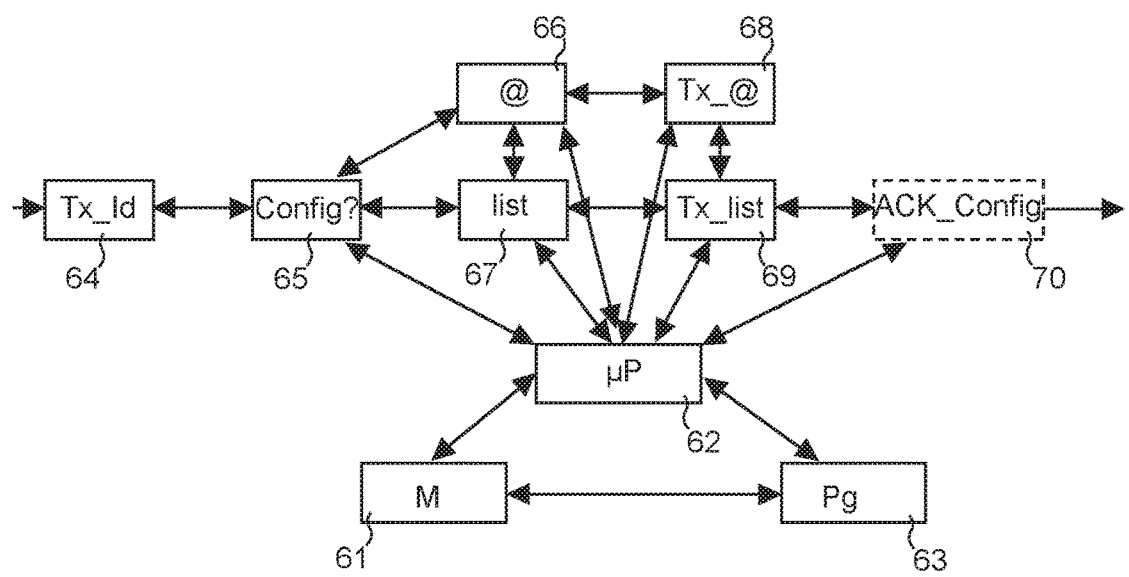
Fig. 6

METHODS FOR CONFIGURING AND MANAGING AN IP NETWORK, CORRESPONDING DEVICES AND COMPUTER PROGRAMS

CROSS-REFERENCE TO RELATED APPLICATIONS

This Application is a Section 371 National Stage Application of International Application No. PCT/FR2014/052329, filed Sep. 19, 2014, which is incorporated by reference in its entirety and published as WO 2015/044565 A1 on Apr. 2, 2015, not in English.

1. FIELD OF THE INVENTION

The field of the invention is that of telecommunications.

More precisely, the invention relates to constructing and managing networks based on the Internet protocol (IP), and in particular constructing and managing networks on the basis of network operator policies.

In particular, the invention relates to networks implementing a policy decision point/policy enforcement point (PDP/PEP) type architecture.

2. PRIOR ART

In a document RFC2753, the resource allocation protocol (RAP) working group of the Internet engineering task force (IETF) has defined a functional architecture that is specific to managing policy-based networks.

That architecture defines two functional elements, referred to as PDP and PEP.

The term PDP designates a device responsible for making decisions and notifying them to PEPs. More precisely, a PDP is responsible for generating decisions representative of various policies (e.g. traffic engineering and routing policies, security policies, quality of service policies, etc.) that need to be executed by one or more PEPs. By way of example, a PDP may be incorporated in a server, a gateway, a router, etc.

The term PEP designates a device responsible for receiving decisions sent by a PDP and for applying them locally. More precisely, a PEP may be defined as a device suitable for performing a set of functions, also referred to as "rules", that are controllable and/or controlled by one or more PDPs. Thus, a PEP is a device responsible for processing commands generated by a PDP (and representative of the decisions made by the PDP and relating to implementing one or more policies). This processing incorporates the process of configuring the functions concerned in equipment that incorporates the PEP (e.g. configuring an IP traffic conditioning function in the context of implementing a quality of service policy), and also reporting the application of decisions made by the PDP. The report is transmitted by the PEP to the PDP and it indicates the success or failure of configuration operations representing the application of a decision. For example, a PEP may be incorporated in an IP node of the network, in a server connected to equipment of the network, in a gateway, etc.

Various protocols can be used for providing communication between a PEP and a PDP, such as the COPS protocol as defined in the document RFC2748, or the COPS-PR protocol as defined in the document RFC3084.

By way of example, such an architecture specific to managing policy-based networks makes it possible to allocate network resources dynamically to a home network or to any other network. The services provided in the network, such as addressing elements constituting the network, or network services required by applications, such as quality of service, can thus be configured dynamically.

To do this, PEPs recover and implement functions or configurations that are supplied to them by one or more PDPs. Thus, on request from a PEP or at its own initiative, a PDP sends configuration elements to a PEP.

Nevertheless, that architecture presents drawbacks. Specifically, on starting, exchanges of information between the PEP and the PDP are always initiated by the PEP. The PEP must contact the PDP and identify itself therewith. For this purpose, the PEP must already have available the address of the equipment incorporating the PDP and the identifier of the PDP that is to be contacted, e.g. the domain name of the PDP, and specifically the fully qualified domain name (FQDN).

Unfortunately, when a new piece of equipment incorporating a PEP module is connected to an existing network, it does not known in advance the identity of the PDP(s) that it needs to contact.

Likewise, the PDP does not know the characteristics of the PEP; in particular, the PDP does not know the list of IP address of the PEP, the configuration, the list of network interfaces of each PEP, the list of functions incorporated by each PEP, the interconnection links with other PEPs, and so on.

Such a network therefore cannot be managed and/or constructed automatically, and it is not simple for a user to connect a new piece of equipment to such a network.

For other types of network, there already exist techniques enabling a new piece of equipment to be connected in simple manner to an existing network.

By way of example, universal plug and plug (UPnP) is a protocol for discovering and controlling services that enable peripherals to discover which services are available (e.g. a printer), and that simplify implementing home networks (file sharing, communications, entertainment) or indeed business networks.

Such a protocol also relies on the IP multicast transmission mode.

Nevertheless, even if such a protocol were used in a policy-based network, it would not make it possible to discover PEPs and/or PDPs automatically. Specifically, if no IP address other than a link-local address is allocated to an IP node (i.e. PEP), than that node cannot make use of a network service (e.g. a DNS service or a print service) if the control point (i.e. the PDP) is not located on the same link as the IP node.

Furthermore, such a protocol is not appropriate for large-scale deployment (e.g. deployment in a network made up of hundreds or thousands of IP nodes, such as the networks of Internet operators).

There therefore exists a need for a new technique for constructing and/or managing policy-based networks that enables a PDP to act automatically to discover the available PEPs and the topology of the network to which the PDP is connected, and/or that enables routable IP addresses to be allocated automatically, and/or that enables a PEP to act automatically to discover its PDP(s).

3. SUMMARY OF THE INVENTION

The invention proposes a novel solution that does not present all of those drawbacks of the prior art, the solution being in the form of a configuration method for configuring a network comprising a node incorporating decision-making functions, referred to as a PDP node, and at least two nodes incorporating decision-executing functions, referred to as PEP nodes, including at least one PEP node that is directly connected to the PDP node and at least one PEP node that is not directly connected to the PDP node. Said method is remarkable in that it performs the following steps:

at a PEP node directly connected to the PDP node:
- identifying said PDP node from a message received by said PEP node and transmitted by said PDP node;
- allocating to said PEP node at least one IP address that is distinct from a link-local address, as transmitted by said PDP node, said at least one IP address being obtained from a set of addresses known to said PDP node; and
- obtaining a list of at least one available IP address for allocating to at least one other node directly connected to said PEP node in said network and not possessing an IP address, referred to as a "undiscovered" node, which list, referred to as a list of "delegated addresses" is transmitted by said PDP node and is obtained from said set of addresses;

at a PEP node that is not directly connected to the PDP node:
- identifying said PDP node from a message received by said PEP node and transmitted by another node of said network possessing an IP address and knowing the IP address of said PDP node, referred to as a "discovered" node, that is directly connected to said PEP node:
- allocating to said PEP node at least one IP address that is distinct from a link-local address, and that is transmitted by said discovered node, said at least one IP address being obtained from a set of addresses known to said PDP node; and
- obtaining a list of at least one available IP address for allocation to at least one other node directly connected to said PEP node in said network and not possessing an IP address, referred to as a "undiscovered" node, which list, referred to as a list of "delegated addresses", is transmitted by said PDP node and is obtained from said set of addresses.

The invention thus proposes a novel solution for automatically configuring a network that does not require prior knowledge of the address of the network node that incorporates decision-making functions (PDP node) in order to be able to operate. The invention thus enables a PEP node to act automatically to discover its PDP(s) and possibly the other PEP nodes of the network.

Furthermore, the proposed solution enables an IP addressing plan to be managed in automatic and distributed manner by "discovering" new nodes step by step (i.e. by giving them at least one IP address) and by delegating to those newly discovered nodes a list of IP addresses from which they can select at least one IP address to allocate to their neighbors. The proposed solution thus makes it possible to allocate IP addresses other than link-local type addresses to nodes of the network. It should be observed that the proposed technique can also be used for configuring addresses of limited range.

The proposed solution also makes it possible to change the IP addresses allocated to nodes without any need to make a connection to each piece of equipment in order to configure it explicitly. The solution thus makes it possible to simplify operations of IP renumbering concerning equipment in a network, thus enabling costs associated with network maintenance to be reduced.

The proposed solution can thus be performed to configure a new network or to reconfigure an existing network.

It should be observed that the IP addresses may come from different address families (e.g. IPv4, IPv6, or any other version). In particular, the proposed technique makes it possible to discover IPv4 addresses, IPv6 addresses, or both at the same time. As a result, the description below makes use of the simplified term "IP address".

In particular, said method performs a step of transmitting a message to at least one node directly connected to said PEP node, that is connected directly or indirectly to the PDP node, which is referred to as a "neighboring node", the message being a configuration request message requesting whether the neighboring node is the PDP node (i.e. a PDP discovery request). Such a method also includes current configuration information concerning the PEP node, such as, for example: a list of identifiers of available network ports on the PEP node; the MAC addresses of interfaces; the activation status of each network interface; the MAC address of the neighbor on a link; the IP address of a neighbor on a given link, etc. Optional other items such as the set of functions supported by the PEP node, the time that has elapsed since the most recent restart, the virtual interface address if such an address was allocated before the restart (STALE_LOOPBACK_ADDRESS), etc. may also be transmitted to the PDP node. This message may be of various types. For example, such a message may be:

- a multicast message, known as MCAST_ARE_YOU_PDP, that is sent to all the nodes neighboring the PEP node, the message having as its source address the IP address of the PEP and as its destination address a well-known address (WKA) for a multicast address; or
- a unicast message, written UNICAST_ARE_YOU_PDP, that is sent to a neighboring node, having as its source address the IP address of the PEP node and as its destination address a unicast address.

According to another particular characteristic, the configuration method performs a step of allocating at least one address of the link-local type to the PEP node prior to the identification step.

It should be recalled that a link-local type address is an IP address of range limited to one link. In other words, an IP packet sent to a link-local type address cannot be transferred beyond the node connected to that link. Link-local type IPv4 addresses are defined in document RFC3927 (more precisely 169.254/16), and link-local type IPv6 addresses are defined in document RFC4291 (more precisely fe80::/64).

In a first implementation, if the PEP node is connected directly to the PDP node (i.e. if the PEP node is a directly-connected undiscovered node), the identification step involves the PEP node receiving a message transmitted by the PDP node and including said at least one IP address for allocating to the PEP node, and the list of delegated addresses.

In this first example, the PEP node receives a message directly transmitted by the PDP node following its PDP discovery request. This message is sent to a unicast address or to a link-local type address of the PEP node, and is called respectively UNICAST_IM_PDP or LL_IM_PDP. The source address of the message is a unicast address associated with the PDP.

In particular, the method includes a step of selecting at least one available IP address from the list of delegated addresses and a step of transmitting a message to at least one undiscovered node that is directly connected to the PEP node, which message includes an address of said PDP node and said at least one selected IP address for allocation to said at least one undiscovered node.

Specifically, the method in at least one implementation of the invention makes it possible to "delegate" to the PEP node a list of available IP addresses, referred to as the list of "delegated addresses". In this list, the PEP node can select one or more addresses for allocating to any one of its neighbors. The list of delegated addresses is then updated.

The PEP node can thus "discover" a neighboring node, by giving it at least one IP address and by informing it of an address for an PDP node.

In a second implementation, if the PEP node is not directly connected to the PDP node, and if the PEP node is directly connected to at least one discovered node (i.e. if the PEP node is an indirectly-connected undiscovered node), the identification step involves the PEP node receiving at least one message transmitted by said at least one discovered node and including an address of said PDP node and said at least one IP address for allocating to said PEP node as selected by said at least one discovered node from the list of delegated addresses as previously received by said at least one discovered node.

In this second implementation, the PEP node receives a message from a discovered node (i.e. a node that has at least one IP address allocated thereto) serving to identify the PDP node and to allocate at least one IP address to the PEP node. The source and destination addresses of this message, called LL_PDP_IS, may be of the link-local type, by way of example.

According to a particular characteristic of the invention, the PEP node selects the greatest address in the event of it receiving a plurality of candidate IP addresses.

Specifically, it is possible for a PEP node to receive from a plurality of respective neighboring nodes a plurality of respective IP addresses of the same family (i.e. IPv4, or IPv6, etc.) that are to be allocated thereto. Under such circumstances, the PEP node selects the greatest received address. For example, an IPv4 address a.b.c.d is said to be greater than a1.b1.c1.d1 if abcd>a1b1c1d1. An IPv6 address: a:b:c:d:e:f:g:k is said to be greater than a1:b1:c1:d1:e1:f1:g1:k1 if abcdefgk>a1b1c1d1e1f1g1k1.

In a variant, the procedure may instead be configured so that it uses the smallest address, or any other logic for making a selection.

In a specific aspect of the invention, the allocation step comprises at least one IP address being allocated to at least one virtual interface of the PEP node.

It should be recalled that a virtual or logical interface, also referred to as a "loopback" interface, is installed by a piece of equipment in the network (e.g. a router) so as to avoid dependency with its physical interfaces. The virtual interface is physically useful for ensuring accessibility to the equipment even in the event of a failure of one of its physical interfaces.

As a result, the address allocated to the virtual interface can be used as a stable identifier for specifying an IP node. A plurality of virtual addresses (in the same family of IP addresses or in distinct families) can be configured.

In a particular implementation, the message received by the PEP node during the identification step includes a flag indicating whether the sender of the message is the PDP node.

By way of example, one such flag is called Is_PDP, that is set to the value "1" to inform destinations that the node sending the message is acting as a PDP. It may in particular be inserted in a multicast message, called MCAST_IM_PDP, transmitted by the PDP node to its neighbors, for which the message source address is the unicast IP address of the PDP and the destination IP address is a dedicated multicast address (WKA), or in the above-defined unicast message UNICAST_IM_PDP.

In particular, if the network has a plurality of PDP nodes, the identification step makes it possible to identify the primary PDP node (also referred to as the main node). The primary PDP node then communicates with the secondary PDP nodes in order to transmit to them the configuration information that concerns them.

The invention thus facilitates inter-PDP communication.

According to a particular characteristic of the invention, the configuration method includes a step of the PEP node receiving a message including a hash representative of the identity of a new PDP node, distinct from the main node, and a step of verifying the identity of the new PDP node by means of a shared key.

Thus, the proposed technique enables the IP address used for identifying and reaching a PDP node to be changed in a manner that is transparent. For example, the proposed technique enables another PDP node to take over in the event of the primary PDP node failing. The PEP nodes can thus discover the new IP address of the PDP node without intervention by a human operator.

In another aspect of the invention, the message transmitted by the PDP node for identifying the PDP node includes timing information, and the allocation step is performed at the end of a period defined by said timing information.

Such timing information, also referred to as a "timer", is written RANDOM_TIMER_VALUE, and it is used to spread out the notification messages in the event of a change of configuration. In particular, making use of such timing makes it possible to avoid the phenomenon of notification messages being synchronized, which can lead to an overload problem in the PDP node in the event of a change of configuration.

In yet another aspect of the invention, the configuration method performs a step of the PEP node transmitting a message to the PDP node, which message includes updated information about the configuration of the PEP node (e.g. describing its interfaces: list of physical ports; list of MAC addresses; link-local type addresses of neighboring interfaces; address of a virtual interface of a neighboring node; capacity of each interface; functions supported by the node, etc.). Such a message, called UNICAST_CONFIG_ACK, is optional, and is sent by the PEP node to its PDP node in order to confirm that it has received the configuration transmitted by the PDP.

In particular, the configuration method includes a step of updating at least one forwarding table associated with the PEP node including information for configuring nodes adjacent to the PEP node.

By way of example, the PEP node feeds its forwarding table (or forwarding information base (FIB)) with information concerning its adjacent nodes, such as the link-local addresses and the MAC addresses of each of the neighbors.

According to a particular characteristic, the configuration method includes a step of updating a variable pointing to the PDP node.

The invention also provides a management method for managing a network and performed in a node of said network that incorporates decision-making functions, referred to as a PDP node.

According to the invention, such a PDP node performs the following steps:

for configuring nodes directly connected to the PDP:
    transmitting a message to at least one node that is directly connected to the PDP node and that does not possess an IP address, referred to as a "directly-connected undiscovered" node, the message enabling it to identify the PDP node;

receiving a configuration request message from said directly-connected undiscovered node;

selecting at least one IP address for allocating to the directly-connected undiscovered node from a set of addresses known to the PDP node, and selecting a list of at least one available IP address for allocation to at least one other node directly connected to the directly-connected undiscovered node, referred to as the list of "delegated addresses", which list of delegated addresses is obtained from said set of addresses; and transmitting to the directly-connected undiscovered node said at least one selected IP address and said selected list of delegated addresses; and for configuring nodes that are not directly connected to the PDP:

receiving a configuration request message from at least one node of the network that is not directly connected to the PDP node, referred to as an "indirectly-connected undiscovered" node;

selecting a list of at least one available IP address for allocation to at least one other node directly connected to said indirectly-connected undiscovered node, referred to as a list of "delegated addresses", which list of delegated addresses is obtained from a set of addresses known to the PDP node; and transmitting said selected list of delegated addresses to the indirectly-connected undiscovered node.

The invention thus proposes a novel solution for automatically discovering PEPs and the topology of a network that is controlled by a PDP node.

In particular, the invention makes it possible to list the network topology and the up-to-date configuration of all of the IP nodes constituting an operational network without any need to activate a plurality of protocols for each of the tasks (e.g. managing the addressing plan, IP configuration, inventory of functions supported by pieces of IP equipment, discovering neighbors, etc.). This global and systematic knowledge of the network contributes particularly to simplifying diagnostic operations in the event of a failure, thus making it possible, a priori, to reduce the cost of operating the network.

Furthermore, advanced functions such as routing or balancing traffic are functions that are characteristic of decision making and/or putting into place a traffic routing policy that is defined and maintained by a PDP node. As a result, the PEP nodes connected to the PDP node need only limited resources for applying the decisions and/or policies as sent out by the PDP node(s). The proposed solution thus encourages the deployment of IP equipment having limited resources, thereby making it possible to reduce the cost of IP equipment, while guaranteeing a transfer service in compliance with the installed routing policy, for example.

According to a particular aspect of the invention, the message serving to identify the PDP node includes timing information, e.g. of the RANDOM_TIMER_VALUE type, as defined above.

In another particular aspect of the invention, the message for identifying the PDP node includes a flag indicating that the transmitter of the message is a PDP node.

By way of example, such a flag is an Is_PDP flag as defined above.

According to a particular characteristic of the invention, the transmission step comprises transmitting a multicast message to nodes that are directly connected to the PDP node at regular time intervals for so long as at least one IP address has not been allocated to each of the nodes directly connected to the PDP node.

The source address of such a multicast message, called MCAST_IM_PDP, may for example be the unicast IP address of the PDP, and the destination IP address may be a dedicated multicast address (WKA).

According to yet another particular characteristic of the invention, the network has a plurality of PDP nodes, including a primary PDP node and at least one secondary PDP node, and the transmission, selection, and reception steps are performed by the primary PDP node. The primary PDP node then transmits to at least one secondary PDP node the configuration information that concerns it.

According to another characteristic of the invention, the management method includes a step of updating at least one routing table as a result of receiving the configuration information.

In particular, the technique of the invention makes it possible to construct routing tables (or a routing information base (RIB)) dynamically without activating a dedicated routing protocol.

According to yet another characteristic, the management method includes a step of determining the topology of the network from received configuration information.

The PDP node can thus act automatically to discover the topology of the network (nodes, functions supported by those nodes, list of network ports, description of the configuration of interfaces at various nodes, activation status of interfaces, links, IP neighbors, etc.) by correlating all of the information as returned by the PEP nodes.

The invention also provides network equipment including decision-executing functions, referred to as a PEP node. Said equipment is remarkable in that it comprises:

a module for identifying a node of said network incorporating decision-making functions, referred to as a PDP node, from a message received by said PEP node and transmitted:

by said PDP node if said PEP node is directly connected to the PDP node; or by another node of said network that possesses an IP address and that knows the IP address of said PDP node, referred to as a "discovered" node, which is directly connected to said PEP node, if said PEP is not directly connected to the PDP node;

a module for allocating to said PEP node at least one IP address that is distinct from a link-local address, and that is transmitted:

by said PDP node if said PEP node is directly connected to the PDP node; or by said discovered node if said PEP node is indirectly connected to the PDP node;

said at least one IP address being obtained from a set of addresses known to said PDP node; and a module for obtaining a list of at least one available IP address for allocation to at least one other node that is directly connected to said PEP node in said network and that does not possess an IP address, referred to as a "undiscovered" node, said list, referred to as a list of "delegated addresses", being transmitted by said PDP node and being obtained from said set of addresses.

Such equipment is particularly adapted to perform the above-described configuration method, as a PEP node.

This equipment may naturally include the various characteristics relating to the configuration method of the invention, which may be combined or taken in isolation. Thus, the characteristics and advantages of the equipment are the same as those of the configuration method, and they are not described in greater detail.

The invention also provides network equipment incorporating decision-making functions, referred to as a PDP node, comprising:
- a module for transmitting a message to at least one node that is directly connected to the PDP node and that does not possess an IP address, referred to as a "directly-connected undiscovered" node, the message enabling it to identify the PDP node;
- a module for receiving a configuration request message from a directly-connected undiscovered node or from a network node that is not directly connected to the PDP node, referred to as an "indirectly-connected undiscovered" node;
- a module for selecting at least one IP address for allocation to a directly-connected undiscovered node from a set of addresses known to the PDP node;
- a module for selecting a list of at least one available IP address for allocation to at least one other node that is directly connected to a directly-connected or indirectly-connected undiscovered node, said list being referred to as a list of "delegated addresses" and being obtained from said set of addresses;
- a module for transmitting said at least one selected IP address to a directly-connected undiscovered node; and
- a module for transmitting said selected list of delegated addresses to a directly-connected or indirectly-connected undiscovered node.

Such equipment is particularly adapted to performing the above-described management method, as a PDP node.

Naturally, the equipment may include the various characteristics relating to the management method of the invention, which may be combined or taken in isolation. Thus, the characteristics and advantages of this equipment are the same as those of the management method and they are not described in greater detail.

The invention also provides a network including at least one PDP node and at least one PEP node, as described above.

The invention also provides one or more computer programs comprising instructions for executing steps of the configuration method as described above and/or of the management method as described above when the programs are executed by a computer.

The invention thus also provides non-removable, or partially or totally removable data storage means including computer program code instructions for executing steps of the configuration method as described above, and/or of the management method as described above.

The methods of the invention may thus be implemented in various ways, in particular in wired form or in software form.

4. LIST OF FIGURES

Other characteristics and advantages of the invention appear more clearly on reading the following description of a particular implementation given merely by way of illustrative and non-limiting example, and with reference to the accompanying drawings, in which:

FIG. 1 shows a reference architecture for an IP network of the invention;

FIGS. 2, 3A, and 3B show respectively the main steps performed by a configuration method and by a management method of the invention;

FIGS. 4A and 4B show implementations of the invention; and

FIGS. 5 and 6 show respectively the simplified structure of a piece of equipment performing decision-executing functions and the simplified structure of a piece of equipment performing decision-making functions in a particular implementation of the invention.

5. DESCRIPTION OF AN IMPLEMENTATION OF THE INVENTION 5.1 General Principles

The invention relates to constructing and managing networks based on network operator policies.

Figure 1:
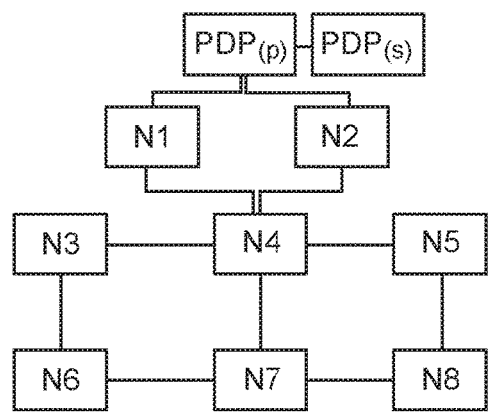

Such an IP network, as shown in FIG. 1, is constituted by a plurality of IP nodes referenced N1, N2, ..., Nn, with n=8, for example. One or more PDPs may be deployed to configure and apply policies for routing, filtering, traffic marking, managing label switching path and multiprotocol label switching (LSP MPLS), etc. The purpose of the PDP is to discover the topology of the underlying network while ensuring consistency in the configuration of IP nodes contributing to providing the IP collectivity service. The purpose of the IP nodes is to discover their PDP(s) and to recover IP addresses enabling them to establish IP communications that are not restricted to a local link. PDP(s) can handle decision-making algorithms such as: calculating the shortest path, calculating a path with constraints, preventing traffic congestion, optimizing electricity consumption by activating on request an emergency node (or a service card, an interface, etc.).

It should be observed that in order to improve the availability of PDPs, it is possible to configure a group of redundant PDPs. For example, an anycast address is used to reach the group of redundant PDPs. For each group of redundant PDPs, one PDP is appointed to act as the primary PDP (written PDP(p)) while the other PDPs are appointed as secondary PDPs (written PDP(s)). In the event of a failure of the primary PDP, one of the secondary PDPs can then take over.

Each node Ni of the reference architecture shown in FIG. 1 incorporates decision-executing functions as described below. Such a node Ni is also referred to as a PEP node in the description below. The PDP nodes of the reference architecture incorporate decision-making functions.

Figure 2:
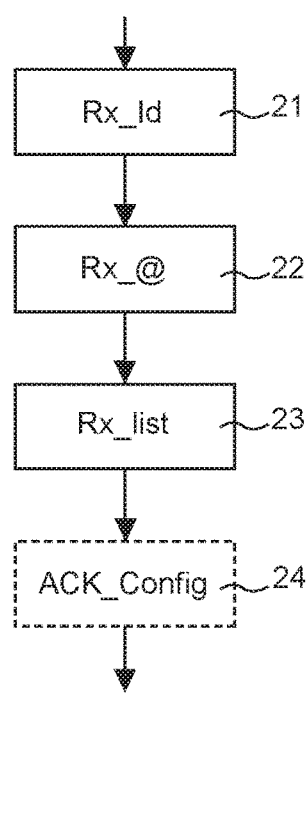

With reference to FIG. 2, there are described in particular the main steps performed in a current node N(i) in the FIG. 1 network.

During a first step 21, the current node N(i) receives a message enabling it to identify a PDP node of the network that incorporates decision-making functions. Such a message is transmitted by a node that is connected directly to the current node, which may be the PDP node or a node discovered in the network, i.e. a node of the network that possesses an IP address and that knows the IP address of the PDP node.

During a second step 22, at least one IP address is allocated to the current node N(i). This IP address is distinct from a link-local address, and it may be transmitted by the PDP node or by the discovered node. This or these IP address(es) is/are selected from a set of addresses known to the PDP node. In particular, the PDP may allocate both an IPv4 address and an IPv6 address to the discovered node.

During a third step 23, the current node N(i) receives a list of at least one available IP address for allocating to at least one other node directly connected to the current node N(i) in the network and not possessing an IP address, referred to as a "undiscovered" node. This list, also referred to as a list of delegated address, is transmitted to the current node N(i) by the PDP node. It is obtained from the set of addresses known to the PDP node and it is regularly updated.

Finally, and optionally, for confirmation purposes, the current node N(i) transmits a message to the PDP node containing updated configuration information about the current node, making it possible to confirm reception of the configuration sent by the PDP, during a fourth step 24.

Such a current node is then considered as being "discovered" and can be used by one of its neighbors to identify the PDP node.

Figure 3A:
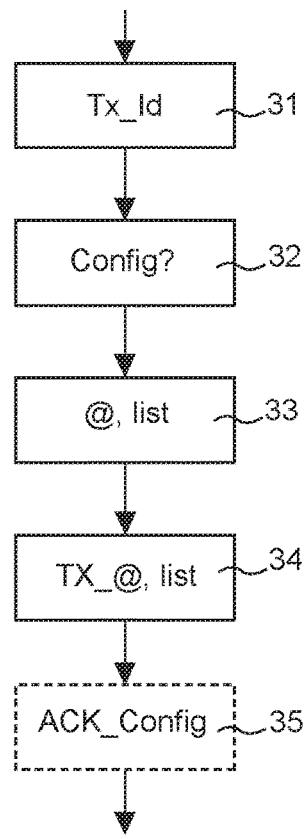
Figure 3B:
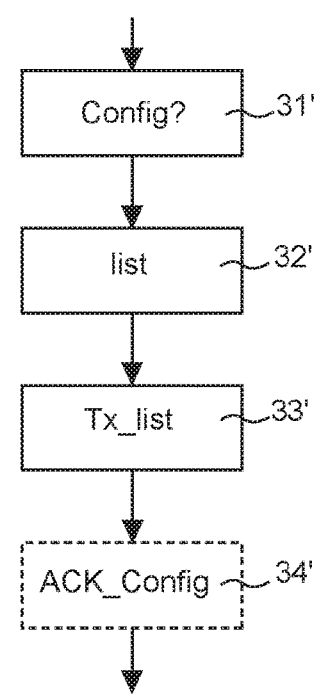

The main steps performed in a PDP node incorporating decision-making functions are shown in FIGS. 3A and 3B. Within the network controlled by the PDP, a distinction is made between nodes that are directly connected to the PDP node, referred to as "directly-connected" nodes, and nodes that are connected to the PDP node in non-direct manner, referred to as "indirectly-connected" nodes.

Consideration is given firstly to a node Ni that is directly connected to the PDP node and that does not possess an IP address, referred to as a "directly-connected undiscovered" node, as shown in FIG. 3A.

During a first step 31, the node PDP(p) transmits a message to at least one such node Ni, which message enables the node Ni to identify the PDP node.

During a second step 32, the PDP(p) node receives a configuration request message from said node Ni. By way of example, this message also includes a list of identifiers of network ports available at the PEP node, the MAC addresses of interfaces, the activation status of each network interface, the MAC address of the neighbor on a link, the IP address of a neighbor on a given link, etc. Optional other items such as the set of functions supported by the PEP node, the time that has elapsed since the most recent start, the address of the virtual interface if such an address has been allocated prior to the starting (STALE_LOOPBACK_ADDRESS), etc., may also be transmitted to the PDP node.

During a third step 33, the PDP(p) node selects firstly at least one IP address to allocate to the node Ni taken from a set of addresses known to the PDP(p) node, and secondly a list of at least one available IP address for allocating to at least one other node that is directly connected to said node Ni, referred to as the list of "delegated addresses", the list of delegated addresses being obtained from said set of addresses and being updated regularly.

During a fourth step 34, the PDP(p) node transmits the selected IP address(es) together with said selected list of delegated addresses to the node Ni.

The previously "undiscovered" node Ni can then be considered as being "discovered", and it can be used by one of its neighbors for identifying the PDP node.

Optionally, for configuration purposes, the PDP(p) node receives a message including updated configuration information of the node Ni, during a fifth step 35, making it possible to confirm reception of the configuration sent by the PDP.

Consideration is now given to a node Ni' that is not directly connected to the PDP node, and that is referred to as an "indirectly-connected undiscovered" node, as shown in FIG. 3B.

During a first step 31', the PDP(p) node receives a message requesting configuration from said node Ni'. By way of example, this message also includes a list of identifiers of the network ports available on the PEP node, the MAC addresses of interfaces, the activation status of each network interface, the MAC address of the neighbor on a link, the IP address of a neighbor on a given link, etc. Optional other items such as the set of functions supported by the PEP node, the time that has elapsed since the most recent restart, the address of the virtual interface if such an interface was allocated before restarting (STALE_LOOPBACK_ADDRESS), etc., may also be transmitted to the PDP node.

During a second step 32', the PDP(p) node selects a list of at least one available IP address for allocating to at least one other node that is directly connected to said node Ni', referred to as the list of "delegated addresses", the list of delegated addresses being obtained from a set of addresses that are known to the PDP node and that is updated regularly.

During a third step 33', the PDP(p) node transmits to the node Ni' said selected list of delegated addresses.

The previously "undiscovered" node Ni' can then be considered as being "discovered", and can be used by one of its neighbors to identify the PDP node.

Optionally, for configuration purposes, the PDP(p) node receives a message including updated configuration information of the node Ni' during a fourth step 34', serving to confirm reception of the configuration sent by the PDP.

5.2 Detailed Description of an Implementation

There follows a description of a particular implementation in which a PDP (or a group of redundant PDPs) is provided with a set of available IP addresses for allocation to virtual interfaces ("loopback") of IP nodes of the network controlled by the PDP or the PDP group. It should be recalled that the set of addresses may contain addresses of IPv4 type, addresses of IPv6 type, IPv4 and IPv6 addresses, or any other IP address. As a result, and as mentioned above, the short name "IP address" is used.

A) General Procedure

In this implementation, a PDP node (or a group of PDP nodes) is given the responsibility of configuring an IP network. A node incorporating the PDP function periodically announces that it is acting as the (primary) PDP. For this purpose, it broadcasts at regular intervals a message to all of its neighbors (i.e. to nodes that are directly connected to the PDP node). The proposed technique adopts an incremental approach, with step-by-step transmission for configuring addresses of virtual interfaces. To each PEP node that is discovered, the PDP delegates a list of IP addresses to be communicated to its immediate neighbors that have not yet completed the configuration and PDP discovery procedure.

It should be observed that the proposed technique also makes it possible to redirect certain nodes to other PDPs once the topology has been discovered.

Each PEP node automatically allocates an IP address (IPv4 and/or IPv6) of the link-local type for its active interfaces. The link-local type address may be generated in random manner, as a function of the media access control (MAC) address of the physical interface, or by using some other method. The function of detecting duplication of link-local type addresses is not necessarily activated in each PEP node, since this function may be implemented by the PDP itself. A PDP can request a node to regenerate another link-local type address in the event of ambiguity.

All of the PEP nodes use a known multicast address (WKA). This multicast address is used by a PEP node to communicate with its neighbors when no address is allocated to a virtual interface of the PEP node. Each PEP node uses its link-local type address to send IP messages when no address is allocated to its virtual interface.

If a PEP node is an immediate neighbor of the PDP node (i.e. if it is directly connected to the PDP node), it discovers the identity (IP address) of the PDP from the periodical announcements made by the PDP or as a result of an explicit response from the PDP such as a response to an explicit message requesting information describing the IP address of the PDP.

If the PEP node is not an immediate neighbor of the PDP, then it recovers the identity (IP address) of the PDP from one of its neighbors that has completed the discovery procedure.

Once the identity of the PDP has been discovered by a PEP node, it is allocated at least one IP address for its virtual interface. The PDP then supplies the PEP node with a list of delegated addresses to allocate to the virtual interfaces of neighbors of that PEP node. By way of example, such a list may be referred to as PEER_LOOPBACK_IP_ADDRESS_POOL. Preferably, each PEP node that has been discovered sends to its PDP its own configuration information describing its interfaces (e.g. a list of physical ports, a list of MAC addresses, link-local type addresses of neighboring interfaces, the address of a virtual interface of a neighboring node, the capacity of each interface, the functions supported by the node, etc.). The PEP node can send its confirmation to the PDP node by using the virtual interface to which an IP address has been allocated. Furthermore, each PEP node maintains a variable pointing to its PDP node (unicast IP address).

B) Definition of Messages

There follows a description of the main messages used in this particular implementation.

The message MCAST_IM_PDP is sent periodically by the PDP node to its immediate neighbors. This message is sent to a known multicast address (WKA). The source address of the message is a unicast address of the PDP. This message may be used by the nodes neighboring the PDP in order to discover the IP address of the PDP.

The UNICAST_IM_PDP message is sent by the PDP node to a node that has sent a PDP node discovery request (e.g. by using the UNICAST_ARE_YOU_PDP message as described below). This message is sent to a unicast address or to a link-local type address. The source address of the message is a unicast address associated with the PDP node. This message may contain a flag pointing to an interface telling a PEP node to regenerate a link-local type address or to use the link-local type address specified in the message, which for this purpose makes use of the parameters INTERFACE_INDEX, LINK_LOCAL_RESET, and ALTERNATE_LL, where INTERFACE_INDEX is an index serving to identify each interface associated with a node, LINK_LOCAL_RESET is a flag of value "1" that tells the node to regenerate a link-local type address, and ALTERNATE_LL is an optional parameter that may contain a link-local type address generated by the PDP. If the parameter ALTERNATE_LL is used in the UNICAST_IM_PDP message, the PEP allocates the address specified in ALTERNATE_LL to the interface having the index INTERFACE_INDEX. The parameter ALTERNATE_LL makes it possible to avoid a conflict of link-local type addresses.

This message may equally well be sent to a PEP node of the network without it having made a request to the PDP node. A UNICAST_IM_PDP message may be sent without being requested as a result of detecting duplication of link-local type addresses, of a change of IP address of the PDP node, of a new policy being installed, of updating the PEER_LOOPBACK_IP_ADDRESS_POOL list, etc.

The UNICAST_ARE_YOU_PDP message is sent by a PEP node to request the destination of the message to confirm that it is acting as a PDP, and if so, to request the PDP node to configure the message sending PEP node (this type of message is referred to below as a "configuration request message"). The source address of the message is a global unicast address; the destination address is the unicast address of the candidate PDP node.

The MCAST_ARE_YOU_PDP message is sent by a PEP node to a WKA multicast address in order to discover the identity of a PDP (this type of message is likewise referred to below as a "configuration request message"). The source address of this message is a link-local type address; the destination address is the WKA multicast address.

The LL_PDP_IS message is sent by a PEP node in response to an MCAST_ARE_YOU_PDP request sent by a neighboring node. The source and destination addresses of this message are link-local type addresses. The message is also used by the PEP node in order to allocate an IP address to the virtual interface of a neighboring node while discovering a PDP.

The UNICAST_CONFIG_ACK message is sent by a PEP node to its PDP in order to confirm reception of the configuration sent by the PDP. This message is optional. The source address of this message is a unicast address; the destination address is the unicast address of the PDP. This message must contain the configuration of the PEP node after taking account of execution of the instructions received from the PDP.

C) Detailed Procedure

The PDP node announces at regular intervals (e.g. once every 30 seconds) that it is acting as a PDP. To do this, the PDP node uses the MCAST_IM_PDP message as defined above. This message contains a flag referred to as Is_PDP which must be set to "1". This flag is used to inform the destinations that the node sending the message is acting as a PDP.

For optimization purposes, the PDP node must stop sending this MCAST_IM_PDP message if all of the nodes that are directly connected to the PDP node are properly configured (i.e. have been discovered). In order to decide whether a PEP node is properly configured, the PDP may, by way of example, verify whether IP addresses have been allocated to all of the virtual interfaces of the nodes that are directly connected to the PDP node. It may be observed that if the PDP node does not receive a multicast message of the MCAST_ARE_YOU_PDP type over any of its interfaces, then the PDP can deduce that all of the nodes that are directly connected thereto have successfully terminated their procedure for PDP discovery, or IP address configuration, and for announcing the functions supported by the PEP node to the PDP node (i.e. they have transmitted configuration information to the PDP node, e.g. comprising a list of interfaces, a status of interfaces, MAC addresses, the MAC address of a neighbor, the IP address of a neighbor, etc.).

In parallel, each (PEP and PDP) node automatically allocates one or more IP addresses (IPv4 or IPv6 or both) of link-local type to each of its active network interfaces. The link-local type address may be generated in random manner, as a function of the MAC address of the physical interface, or by using some other method.

On initialization, in addition to generating link-local type addresses, each PEP node sends the MCAST_ARE_YOU_PDP message to all of its neighbors. The MCAST_ARE_YOU_PDP message also contains a list of identifiers of network ports available on the PEP node (each interface is identified by the index INTERFACE_INDEX), the MAC addresses of the interfaces, the activation status of each network interface, the MAC address of the neighbor on a link, the IP address of a neighbor on a given link, etc. Optional other items, such as all of the functions supported by the PEP node, the time that has elapsed since the most recent restart, the address of the virtual interface if such an address was allocated before the restart (STALE_LOOP-BACK_ADDRESS), etc., may also be transmitted to the PDP node.

Two situations need to be considered in the context of receiving the MCAST_ARE_YOU_PDP message:

1. Either the node neighboring the current PEP node that sent the MCAST_ARE_YOU_PDP message is a PDP node: in which case the PDP node responds with the UNICAST_IM_PDP message having as its source address an IP unicast address and as its destination address the link-local type address of the current node. The flag Is_PDP is set to "1" to indicate that this neighboring node is a PDP node. The UNICAST_IM_PDP message sent by the PDP node also includes at least one IP address to be configured as the address of the virtual interface of the current node (LOOPBACK_ADDRESS). In addition, the UNICAST_IM_PDP message sent by the PDP node includes a list of delegated addresses referred to as: PEER_LOOPBACK_IP_ADDRESS_POOL. This list is used by the current node to allocate an IP address other than the link-local type address to one of its neighbors seeking to discover a PDP. The variable PEER_LOOPBACK_IP_ADDRESS_POOL contains a list of IP addresses that are not necessarily contiguous. The UNICAST_IM_PDP message sent by the PDP node may also include timing information, referred to as RANDOM_TIMER_VALUE, that is used for spreading out notification messages in the event of a change of configuration. By way of example, a RANDOM_TIMER_VALUE is selected in random manner in order to tell the PEP node how long it should wait after an event leading to a change of configuration (e.g. an interface becoming unavailable) prior to sending the notification message to the PDP node.

2. Or else, the node neighboring the current PEP node that sent the MCAST_ARE_YOU_PDP message is not acting as a PDP, but it knows the identity of a PDP. The node neighboring the current PEP node then responds with the LL_PDP_IS message. The flag Is_PDP is set to "0" indicating that the node sending the LL_PDP_IS message is not a PDP. The LL_PDP_IS message includes the IP address of the PDP node. For example, this message also includes one or two non-"link-local" IP addresses a.b.c.d (IPv4) or a:b:c:d (IPv6) for allocating to the virtual interface of the current node. The current node selects this address (or these addresses) from the list of addresses delegated by the PDP (defined by the variable PEER_LOOPBACK_IP_ADDRESS_POOL).

a) On receiving the LL_PDP_IS message, the current node sends the UNICAST_ARE_YOU_PDP message to the address of the PDP in the LL_PDP_IS message (received from one of its neighbors). Thus, the destination address of the UNICAST_ARE_YOU_PDP message is the unicast address of the PDP and the source address is the address allocated by the neighboring node. The UNICAST_ARE_YOU_PDP message also includes configuration information for the current node, such as for example a list of identifiers of network ports available on the current node, the MAC addresses of the active interfaces, the MAC address of the neighbor on a link, the IP address of a neighbor on a given link, etc., and possibly also other optional items such as the functions supported by the current node, the time that has elapsed since the most recent restart, the address of the virtual interface, etc. The UNICAST_ARE_YOU_PDP message must be sent over the interface for which a virtual address has been allocated.

i) If a plurality of candidate IP addresses are communicated to a current node by neighboring nodes, the "greatest" IP address is selected.
    ii) If an IP address of the same family has already been configured for the virtual interface, then the current node need not take account of the new candidate addresses received from other neighbors.

b) The PDP node then responds with the UNICAST_IM_PDP message having as its source address an IP unicast address and as its destination IP address the unicast address of the current node. The flag Is_PDP is set to "1" to indicate that this node is a PDP node. The UNICAST_IM_PDP message also contains the list of delegated addresses PEER_LOOPBACK_IP_ADDRESS_POOL. This list is used by the current node to allocate an IP address that is not of the "link-local" type to one of its neighbors that is in the process of discovering a PDP. The UNICAST_IM_PDP message also contains the timing information RANDOM_TIMER_VALUE used to spread out notification messages in the event of a change of configuration. The PDP node can then decide to modify the IP configuration of the virtual interface of the current node: it suffices to include specific information of the ADDRESS LOOPBACK type in a UNICAST_IM_PDP message in order to request the current node to change its configuration. The current node must then update its configuration.

Optionally, the PEP node can confirm reception of configuration instructions by sending a UNICAST_CONFIG_ACK message to the PDP node.

The current node feeds its forwarding table (FIB) with information about its neighboring nodes (i.e. link-local type address and MAC address of each neighbor).

Once the PEP nodes are configured (i.e., in this implementation, once an IP address has been allocated to the virtual interface of each PEP node), the PDP can then apply policies throughout the detected nodes. For example, the PDP may install a new entry into the routing table (RIB), add a new routing table (it should be observed that a plurality of routing tables RIB can be maintained), install a new entry in a forwarding table FIB, add a new FIB (it is possible to make any plurality of forwarding tables), install an LSP MPLS, install a new policy for marking traffic, install a new quality of service (QoS) policy, etc.

At the end of this procedure, the PDP has complete knowledge of the topology of the network. In particular, the PDP uses the link-local type address locally allocated to the connection interface on a link and the address allocated to the other end of the same link by the neighbor in order to detect links between IP nodes. The MAC address may be discovered by using conventional protocol machineries such as the address resolution protocol (ARP) or ICMPv6.

In the event of a change in the configuration of a PEP node (e.g. an interface becoming unavailable, a failure, etc.), the PEP node sends its updated configuration to the PDP node. In order to avoid overloading problems associated with transient failures, a change is sent only if the failure lasts for some predetermined number of seconds; this threshold may be preconfigured on each PEP node. If a failure of one of the interfaces is detected, the PEP node maintains its configuration in a stage referred to as "STALE"; once the connection has been reestablished, an update is sent to the PDP node.

A PDP node is appointed to be responsible for configuring a set of nodes making up an IP network. Nevertheless, the procedure described makes it possible to redirect the PEP functions incorporated in certain nodes to other PDPs once the topology of the IP network has been discovered and taking account of the functions that are supported by the nodes, as described with the PDP node. For example, a UNICAST_IM_PDP message may be sent to a node of the network without that node making a request to the PDP. A UNICAST_IM_PDP message may be sent without being requested, e.g. on detecting duplication of link-local type addresses, on a change of the IP address of the PDP, on a new policy being installed, on updating the list of delegated addresses PEER_LOOPBACK_IP_ADDRESS_POOL, etc.

The UNICAST_IM_PDP message may contain a flag pointing to an interface telling a PEP node to regenerate a link-local type address or to use the link-local type address specified in the message, with this being done by using the parameters INTERFACE_INDEX, LINK_LOCAL_RE-SET, and ALTERNATE_LL. A plurality of interfaces may be reconfigured using a single UNICAST_IM_PDP message.

The UNICAST_IM_PDP message may also give the identity of one (or several other) PDP nodes responsible for other decision domains (e.g. return of network counters), e.g. in the following form: (ALTERNATE_PDP: IP address, ACTION). The ACTION variable tells the PEP node what action to take with the other PDP node. An example of an action is to send immediately the UNICAST_ARE_Y-OU_PDP message to that new PDP node. It should be observed that a plurality of (ALTERNATE_PDP: IP address, ACTION) pairs may be included in a single UNICAST_IM_PDP message.

The PDP node must also send the UNICAST_IM_PDP message to a node of the network in order to update the list of delegated addresses (PEER_LOOPBACK_IP_AD-DRESS_POOL). The PEP node must then use this new list in order to allocate addresses to its immediate neighbors.

The PDP node can also send the UNICAST_IM_PDP( ) message to a node of the network in order to change the address of the virtual interface of an IP node.

For security reasons, a shared secret may be exchanged between the PDP node and each discovered PEP node (e.g. using the UNICAST_IM_PDP message) on the basis of a (dynamic) key management process. The key is used to generate a security hash that is used when a PDP switches from being a primary PDP to a secondary PDP. Specifically, another PDP identified by an IP address other than the address used during the topology discovery procedure may take over by sending a UNICAST_IM_PDP message to a node of the network and by including a security hash using the shared key. Once this message has been received by a PEP node, it verifies the security hash using the shared key. If the verification makes it possible to confirm the identity of the secondary PDP, then the PEP node accepts instructions from this new PDP; otherwise the message is ignored.

A plurality of PDPs implementing different decision-making algorithms may be deployed in a single network. Although the present implementation concentrates on the behavior of the PDP (or PDPs) responsible for discovering topology, for configuring a set of IP functions, including routing functions (with or without traffic engineering (TE)) constraints, it is possible to activate other PDPs that are capable of making other decisions. For example, another PDP may be responsible for placing legal interception filters, for collecting billing tickets, etc. These PDPs require information about the configuration of the network (maintained by the PDP as described in this implementation) together with the capabilities of each IP node of the network. A dedicated communications interface between the PDPs may be activated for exchanging information and/or for coordination purposes in order to make decisions involving a plurality of PDPs. Orchestration of these PDPs may be performed automatically or it may be guided by the intervention of a human operator.

An automatic implementation for PDP discovery (together with their functional capabilities) is to use a dedicated multicast channel over which only PDPs can send and listen. A PDP can then join or leave the PDP group by sending a message that is broadcast to its peer PDPs. On receiving the multicast message, a PDP retains in memory the unicast address used for sending the broadcast message together with the functions of the PDP that send the broadcast message. These records are used by the PDP to determine which PDP is responsible for given operations. This channel enables a PDP to recover the topology of the network and the configuration of the network.

5.3 Application Examples

With reference to FIGS. 4A and 4B, there follows a description of the various messages transmitted between different pieces of equipment in a network of the invention.

As shown in FIG. 4A, it is assumed that equipment associated with the node N1 has just joined the network. It is also assumed that each node automatically allocates one or more IP addresses of the link-local type to each of its active interfaces.

On initialization, the node N1 sends a configuration request message MCAST_ARE_YOU_PDP over all of its active interfaces, i.e. to the PDP node, to the node N2, and to the node N4. This message also contains current configuration information about the node N1 (e.g.: the list of active interfaces of N1; their link-local type addresses; their MAC addresses; the IP/MAC addresses of neighbors on each active link (i.e. N1-PDP, N1-N2, and N1-N4) interfaces).

Since the PDP node is directly connected to the node N1 (immediate neighbor, also referred to as a "directly-connected undiscovered" node), the PDP node responds with a UNICAST_IM_PDP message, as shown in FIG. 4B. The node N1 can thus identify the PDP node incorporating decision-making functions on the basis of the UNICAST_IM_PDP message transmitted by the PDP node. The UNICAST_IM_PDP message also includes at least one IP address to be allocated to an interface of the node N1, e.g. to its virtual interface. The UNICAST_IM_PDP message may also send to the node N1 a list of at least one available IP address for allocation to at least one other undiscovered node that is directly connected to the node N1 in the network (i.e. the nodes N2 and N4), referred to as the list of "delegated addresses". The node N1 then optionally transmits to the PDP node the UNICAST_CONFIG_ACK message including updated configuration information relating to the node N1.

At the end of this procedure, the PDP has discovered the list of active interfaces of the node N1, their link-local addresses, the MAC addresses, the IP/MAC addresses of neighbors on each active link (i.e. interfaces N1-PDP, N1-N2, and N1-N4), and the node N1 is considered as being "discovered".

If the nodes N2 and N4 are not known to the PDP node, then the PDP can send a UNICAST_IM_PDP message to N1 including a list of delegated addresses e.g. including two unicast addresses for allocation to the nodes N2 and N4 (PEER_LOOPBACK_IP_ADDRESS={IP@1, IP@2}).

It is now assumed that the equipment associated with the node N4 is switched on. The node N4 is directly connected to the node N1, which knows the identity of the PDP node, but it is not directly connected to the PDP node. The node N4 is thus an "indirectly-connected undiscovered" node.

The node N4 sends the configuration request message UNICAST_ARE_YOU_PDP to its neighbors (N1, N2, N3, N5, and N7). Since the node N1 has already been configured (is already discovered), the node N1 responds with the LL_PDP_IS message: this message contains the IP address of the PDP node together with the address IP@1. It thus makes it possible to identify the node of the network that incorporates decision-making functions and to allocate to the node N4 an IP address that is distinct from a link-local type address.

The node N4 configures the address IP@1 to its virtual interface and sends the UNICAST_ARE_YOU_PDP message to the address of the PDP. This UNICAST_ARE_YOU_PDP message includes current configuration information concerning the node N4. It is sent to the node N1, which takes charge of transferring it to the PDP. The PDP then responds directly to the node N4 by sending it a UNICAST_IM_PDP message including a list of at least one available IP address for allocation to at least one other node directly connected to the node N4 (i.e. the nodes N2, N3, N5, and N7).

Optionally, the node N4 transmits to the PDP node the UNICAST_CONFIG_ACK message including updated configuration information concerning the node N4.

These various steps may be repeated for all of the nodes until they are all known to the PDP node.

In parallel, it should be observed that the PDP node can act at regular time intervals (e.g. once every 30 seconds) to send the MCAST_IM_PDP message. On this topic, it should be observed that there is no specific chronology to be maintained between sending the MCAST_IM_PDP message from the PDP and sending the MCAST_ARE_YOU_PDP or UNICAST_ARE_YOU_PDP type messages from the PEP nodes.

The invention finds applications in numerous fields.

By way of example, the invention finds applications in the field of constructing and managing hierarchical business networks or home networks in which one of the routers that connects the local network to an external network incorporates a PDP function, while all of the other nodes incorporate a PEP function. In a business network, the PDP may be incorporated in a network element other than the router connecting the business network to the broadband network. The technique of the invention thus makes it possible to guarantee consistency in the policy for configuring IP functions at the scale of the business network or of the home network, and it can also guarantee that routing tables are constructed without user intervention and without activating routing protocols. Furthermore, the proposed technique makes it possible to apply policies such as sending service requests to the nearest machine (e.g. the printer on the same floor). As a result, the proposed technique contributes to improving customer experience, by introducing a high level of automation in the process of producing network services.

In another example, the invention may be implemented so as to handle temporary requests for increased network capacity (e.g. during sporting events for a month or a week). In this situation, a network may be extended in simple and effective manner by performing the invention. Nodes that are "grafted" to the network can thus acquire their configurations and provide connectivity service (with or without installing a traffic engineering policy) without the need for intervention by a human operator and without activating a distributed routing protocol. The proposed technique thus makes it possible to automate installation of a network planning policy on request, thereby having the potential of reducing operating costs (including maintenance costs).

The invention can thus be performed on an existing network, or in order to construct a new network, in a fixed network, or a mobile network, etc.

5.4 Structure of Equipment in Accordance with the Invention

Finally, with reference to FIGS. 5 and 6 respectively, there follows a description of the simplified structure of a piece of network equipment incorporating decision-executing functions (PEP) and the simplified structure of a piece of network equipment incorporating decision-making functions (PDP).

As shown in FIG. 5, a piece of network equipment incorporating decision-executing functions, referred to as a PEP node, comprises a memory 51 including a buffer memory, a processor unit 52, e.g. having a microprocessor µP, and controlled by a computer program 53, for performing the configuration method of the invention.

On initialization, the computer program code instructions 53 are loaded by way of example into a random access memory (RAM) prior to being executed by the processor of the processor unit 52. The processor unit 52 receives as input at least one message from a PDP node or some other node of the network possessing an IP address and knowing the IP address of the PDP node. The microprocessor of the processor unit 52 performs the steps of the above-described configuration method by means of the instructions in the computer program 53 in order to identify the PDP node, allocate an IP address to the PEP node, and transmit to the PDP node information about the configuration of the PEP node. For this purpose, in addition to the buffer memory 51, the PEP node includes a module 54 for identifying the PDP node, a module 55 for allocating to the PEP node at least one IP address, a module 56 for obtaining a list of delegated addresses, and optionally a module 57 for transmitting to the PDP node a message including updated configuration information concerning the PEP node. These modules are controlled by the microprocessor of the processor unit 52.

As shown in FIG. 6, a piece of equipment in a network that incorporates decision-making functions, referred to as a PDP node, comprises a memory 61 including a buffer memory, a processor unit 62, e.g. having a microprocessor µP, and controlled by a computer program 63 for implementing the management method of the invention.

On initialization, the computer program code instructions 63 are loaded by way of example into a RAM prior to being executed by the processor of the processor unit 62. The processor unit 62 has a set of IP addresses to allocate to equipment in the network. The microprocessor of the processor unit 62 performs the steps of the above-described management method using the instructions of the computer program 63 in order to configure the PEP nodes. For this purpose, in addition to the buffer memory 61, the PDP node includes a module 64 for transmitting a message enabling the PEP node to be identified, a module 65 for receiving a message requesting configuration from a PEP node, a module 66 for selecting at least one IP address to allocate to a directly-connected PEP node, a module 67 for selecting a list of dedicated addresses, a module 68 for transmitting to a directly-connected PEP node said at least one selected IP address, a module 69 for transmitting to a PEP node said selected list of delegated addresses, and optionally, a module 70 for receiving a message including updated configuration information about a PEP node. These modules are controlled by the microprocessor of the processor unit 62.

The invention claimed is:

1. A method for configuring a network, said network comprising a node incorporating decision-making functions, referred to as a PDP node, and at least two nodes incorporating decision-executing functions, referred to as PEP nodes, including at least one first PEP node that is directly connected to the PDP node and at least one second PEP node that is not directly connected to the PDP node, wherein the method for configuring a network comprises the following acts:

identifying said PDP node from said message received by said first PEP node and transmitted by said PDP node;

transmitting a configuration request message to said PDP node comprising configuration information about said at least one first PEP node, said information comprising a list of active network interfaces of said first PEP node;

allocating to said first PEP node at least one IP address transmitted by said PDP node in a response message to said configuration request message, said at least one IP address being distinct from a link-local address, said at least one IP address being obtained from a set of addresses known to said PDP node; and obtaining a list of available IP addresses for allocating by the first PEP node to the other nodes directly connected to said first PEP node through each of said active network interfaces in said network and not possessing an IP address, referred to as undiscovered nodes, said list, referred to as a list of delegated addresses, consisting of an IPv4 address, an IPv6 or both an IPv4 address and an IPv6 address for each of said undiscovered nodes, said list being obtained from said set of addresses and being transmitted by said PDP node in said message;

at the at least one second PEP node that is not directly connected to the PDP node:

transmitting to at least one node, which is directly connected to said second PEP node, a message for discovering said PDP node;

identifying said PDP node from a response message received by said second PEP node and transmitted by another node of said network possessing an IP address and knowing the IP address of said PDP node, referred to as a discovered node, that is directly connected to said second PEP node:

allocating to said second PEP node, by said discovered node, at least one IP address that is distinct from a link-local address, said at least one IP address being selected from a list of at least one available IP address previously obtained by said discovered node, said list being obtained from a set of addresses known to said PDP node;

transmitting to said PDP node a message for confirmation that it is acting as a PDP node, said message comprising configuration information of said second PEP node, said information comprising a list of active interfaces of said second PEP node; and obtaining a list of available IP addresses for allocation, by said second PEP node, to the other nodes directly connected to said second PEP node through one of said active interfaces in said network and not possessing an IP address, referred to as undiscovered nodes, said list, referred to as a list of delegated addresses, consisting of an IPv4 address, an IPv6 address or both an IPv4 address and an IPv6 address, said list being transmitted by said PDP node in a response message to said request for confirmation and being obtained from said set of addresses.

2. The configuration method according to claim 1, wherein said method comprises transmitting a message to at least one node directly connected to said at least one first PEP node or to said at least one second PEP node, which is referred to as a neighboring node, the message being a configuration request message requesting whether said neighboring node is said PDP node.

3. The configuration method according to claim 1, further comprising selecting at least one available IP address from said list of delegated addresses and transmitting a message to at least one undiscovered node that is directly connected to said first PEP node, wherein said message includes an address of said PDP node and said at least one selected IP address for allocation to said at least one undiscovered node.

4. The configuration method according to claim 1, wherein identifying said PDP node from a message received by said second PEP node includes receiving by said second PEP node at least one message transmitted by said at least one discovered node and including an address of said PDP node and said at least one IP address for allocating to said second PEP node as selected by said at least one discovered node from said list of delegated addresses as previously received by said at least one discovered node.

5. The configuration method according to claim 1, wherein allocating to said first PEP node includes allocating at least one IP address to at least one virtual interface of the first PEP node; or allocating to said second PEP node includes allocating at least one IP address to at least one virtual interface of the second PEP node.

6. The configuration method according to claim 1, wherein said message received by said first PEP node during identifying said PDP node includes a flag indicating whether the sender of the message is said PDP node.

7. The configuration method according to claim 1, further comprising updating at least one forwarding table associated with said first or second PEP node including information for configuring nodes adjacent to said first or second PEP node.

8. A management method comprising:

managing a network by a node of said network that incorporates decision-making functions, referred to as a PDP node, wherein managing comprises the following acts:

for configuring nodes directly connected to the PDP:

transmitting a message to at least one PEP node that is directly connected to said PDP node and that does not possess an IP address, referred to as a directly-connected undiscovered PEP node, the message enabling it to identify said PDP node;

receiving a configuration request message from said directly-connected undiscovered PEP node, said message comprising configuration information of said directly-connected undiscovered PEP node, said information comprising a list of active network interfaces;

selecting at least one IP address for allocating to said directly-connected undiscovered PEP node from a set of addresses known to said PDP node, and selecting a list of available IP addresses for allocation to the other nodes directly-connected to the directly-connected undiscovered PEP node through one of said active network interfaces in said network and not possessing an IP address, referred to as undiscovered nodes, said list referred to as the list of delegated addresses, being obtained from said set of addresses and consisting of an IPv4 address, an IPv6 address or both an IPv4 address and an IPv6 address for each of said undiscovered nodes; and transmitting to said directly-connected undiscovered PEP node said at least one selected IP address and said selected list of delegated addresses in a response message to said configuration request message; and for configuring PEP nodes that are not directly connected to the PDP:

receiving a message for confirmation that it is acting as a PDP node from at least one node of the network that is not directly connected to the PDP node, referred to as an indirectly-connected undiscovered node, said message comprising configuration information of said indirectly-connected undiscovered PEP node, said information comprising a list of active network interfaces of said indirectly-connected undiscovered node;

selecting a list of available IP addresses for allocation to the other nodes directly connected to said indirectly-connected undiscovered PEP node through one of said active network interfaces in said network and not possessing an IP address, referred to as undiscovered nodes, said list, referred to as a list of delegated addresses, being obtained from a set of addresses known to the PDP node and consisting of an IPv4 address, an IPv6 address or both an IPv4 address and an IPv6 address for each of said undiscovered nodes; and transmitting said selected list of delegated addresses to the indirectly-connected undiscovered PEP node.

9. The management method according to claim 8, wherein said act of transmitting a message enabling said PDP node to be identified comprises transmitting a multicast message to nodes that are directly connected to said PDP node at regular time intervals for so long as at least one IP address has not been allocated to each of the nodes directly connected to said PDP node.

10. The management method according to claim 8, further comprising updating at least one routing table as a result of receiving said configuration information.

11. A network node including decision-executing functions, referred to as a PEP node, wherein the network node comprises:

at least one processor; and at least one non-transitory computer-readable medium comprising instructions stored thereon, which configure the at least one processor to implement the decision-executing functions and wherein the instructions comprise instructions for:

identifying a node of said network incorporating decision-making functions, referred to as a PDP node, from a message received by said PEP node and transmitted:

by said PDP node if said PEP node is directly connected to the PDP node; or by another PEP node of said network that possesses an IP address and that knows the IP address of said PDP node, referred to as a discovered PEP node, which is directly connected to said PEP node, if said PEP is not directly connected to the PDP node, in response to a message for discovering said PDP node;

transmitting if the PEP node is directly connected to the PDP node a configuration request message comprising configuration information of said PEP node, said information comprising a list of active network interfaces of said PEP node; and if the PEP node is not directly connected to the PDP node, a message for discovering the PDP node to the discovered node and a message for confirmation that it is acting as a PDP node to the PDP node, said message for confirmation comprising configuration information of said PEP node, said information comprising a list of active network interfaces of said PEP node;

allocating to said PEP node, by said discovered PEP node, at least one IP address that is distinct from a link-local address, said at least one IP address being selected from a list of at least one available IP address previously obtained by said discovered PEP node, said list being obtained from a set of addresses known to said PDP node and transmitted by said PDP node; and obtaining a list of available IP addresses for allocation, by said PEP node, to the other nodes that are directly connected to said PEP node in said network through one of said active interfaces in said network and that do not possess an IP address, referred to as undiscovered PEP nodes, said list, referred to as a list of delegated addresses, consisting of an IPv4 address, an IPv6 address or both an IPv4 address and an IPv6 address for each undiscovered node, being transmitted by said PDP node and being obtained from said set of addresses.

12. A network node incorporating decision-making functions, referred to as a PDP node, wherein the network node comprises:

at least one processor; and at least one non-transitory computer-readable medium comprising instructions stored thereon, which configure the at least one processor to implement the decision-executing functions and wherein the instructions comprise instructions for:

transmitting a message to at least one PEP node that is directly connected to said PDP node and that does not possess an IP address, referred to as a directly-connected undiscovered PEP node, the message enabling it to identify said PDP node;

receiving a configuration request message from a directly-connected undiscovered PEP node or a message for confirmation that it is acting as a PDP node from a network node that is not directly connected to the PDP node from a network node that is not directly connected to the PDP node, referred to as an indirectly-connected undiscovered PEP node, said message comprising configuration information of said PEP node, said information comprising a list of active network interfaces of said PEP node;

selecting at least one IP address for allocation to a directly-connected undiscovered PEP node from a set of addresses known to said PDP node;

selecting a list of available IP addresses for allocation to the other nodes that are directly connected to a directly-connected or indirectly-connected undiscovered PEP node through each of said active network interfaces in said network and that do not possess an IP address, referred to as undiscovered nodes, said list, referred to as a list of delegated addresses, consisting of an IPv4 address, an IPv6 address or both an IPv4 address and an IPv6 address for each of said undiscovered nodes and being obtained from said set of addresses;

transmitting said at least one selected IP address to a directly-connected undiscovered PEP node; and transmitting said selected list of delegated addresses to a directly-connected or indirectly-connected undiscovered PEP node.

13. A non-transitory, non-removable or partially or completely removable data storage medium including computer program code instructions stored thereon for executing a configuration method when the instructions are executed by a computer, therein the instructions configure the computer to perform acts of:
  configuring a network comprising a node incorporating decision-making functions, referred to as a PDP node, and at least two nodes incorporating decision-executing functions, referred to as PEP nodes, including at least one PEP node that is directly connected to the PDP node and at least one PEP node that is not directly connected to the PDP node, wherein configuring comprises the following acts:
  at the at least one first PEP node directly connected to the PDP node:
    identifying said PDP node from said message received by said first PEP node and transmitted by said PDP node;
  transmitting a configuration request message to said PDP node comprising configuration information about said at least one first PEP node, said information comprising a list of active network interfaces of said first PEP node;
    allocating to said first PEP node said at least one IP address transmitted by said PDP node in a response message to said configuration request message, said at least one IP address being distinct from a link-local address, said at least one IP address being obtained from a set of addresses known to said PDP node; and
    obtaining a list of available IP addresses for allocating by the first PEP node to the other nodes directly connected to said first PEP node through one of said active network interfaces in said network and not possessing an IP address, referred to as undiscovered nodes, said list, referred to as a list of delegated addresses, consisting of an IPv4 address, an IPv6 address or both an IPv4 address and an IPv6 address for each of said undiscovered nodes, said list being obtained from said set of addresses and being transmitted by said PDP node in said message;
  at the at least one second PEP node that is not directly connected to the PDP node:
  transmitting to at least one node, directly connected to said second PEP node, termed neighboring node, a message for discovering said PDP node;
    identifying said PDP node from a response message received by said second PEP node and transmitted by another node of said network possessing an IP address and knowing the IP address of said PDP node, referred to as a discovered node, that is directly connected to said PEP node:
    allocating to said second PEP node, by said discovered node, at least one IP address that is distinct from a link-local address, said at least one IP address being selected from a list of at least one available IP address previously obtained by said discovered node, said list being obtained from a set of addresses known to said PDP node;
  transmitting to said PDP node a message for confirmation that it is acting as a PDP node, said message comprising configuration information of said second PEP node, said information comprising a list of active interfaces of said second PEP node; and
    obtaining a list of available IP addresses for allocation, by said second PEP node, to the other nodes directly connected to said second PEP node through each of said active interfaces in said network and not possessing an IP address, referred to as undiscovered nodes, said list, referred to as a list of delegated addresses, consisting of an IPv4 address, an IPv6 address or both an IPv4 address and an IPv6 address for each of said undiscovered nodes, said list being transmitted by said PDP node in a response message to said request for confirmation and being obtained from said set of addresses.

14. A non-transitory, non-removable or partially or completely removable data storage medium including computer program code instructions stored thereon for executing a management method when the instructions are executed by a computer, therein the instructions configure the computer to perform acts of:
  managing a network by a node of said network that incorporates decision-making functions, referred to as a PDP node, wherein managing comprises the following acts:
    for configuring PEP nodes directly connected to the PDP:
    transmitting a message to at least one PEP node that is directly connected to said PDP node and that does not possess an IP address, referred to as a directly-connected undiscovered PEP node, the message enabling it to identify said PDP node;
    receiving a configuration request message from said directly-connected undiscovered PEP node, said message comprising configuration information of said directly-connected undiscovered node, said information comprising a list of active network interfaces;
    selecting at least one IP address for allocating to said directly-connected undiscovered PEP node from a set of addresses known to said PDP node, and selecting a list of available IP addresses for allocation by said directly-connected undiscovered PEP node, to the other nodes directly connected to said directly-connected undiscovered PEP node through one of said active interfaces in said network and not possessing an IP address, referred to as undiscovered nodes, said list, referred to as the list of delegated addresses, consisting of an IPv4 address, an IPv6 address or both an IPv4 address and an IPv6 address for each of said undiscovered nodes; and
    transmitting to said directly-connected undiscovered PEP node, said at least one selected IP address and said selected list of delegated addresses in a response message to said configuration request message; and
    for configuring nodes that are not directly connected to the PDP:
    receiving a message for confirmation that it is acting as a PDP node from at least one node of the network that is not directly connected to the PDP node, referred to as an indirectly-connected undiscovered PEP node, said message comprising configuration information of said indirectly-connected undiscovered PEP node, said information comprising a list of active network interfaces of said indirectly-connected undiscovered PEP node;
    selecting a list of available IP addresses for allocation by said directly-connected undiscovered PEP node to each other node directly connected to said indirectly-connected undiscovered PEP node through one of said active network interfaces in said network and not possessing an IP address, referred to as an undiscovered node, said list, referred to as a list of delegated addresses, consisting of an IPv4 address, an IPv6 address or both an IPv4 address and an IPv6 address for each of said undiscovered nodes, said list being transmitted by said PDP node in a response message to said request for confirmation and being obtained from a set of addresses known to the PDP node; and transmitting said selected list of delegated addresses to the indirectly-connected undiscovered node.

\* \* \* \* \*